Feb. 1, 1955  D. P. MAKER  2,700,967
FUEL SYSTEM OF INTERNAL-COMBUSTION ENGINES
Filed June 2, 1953
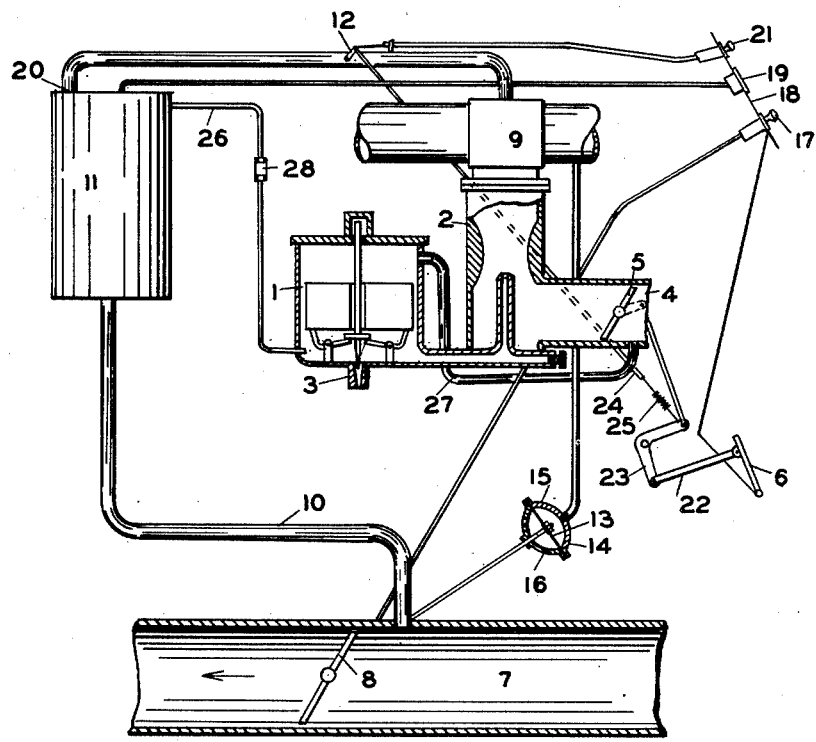
INVENTOR
Daniel P. Maker
By Watson, Cole, Grindle &
Watson
ATTORNEYS

2,700,967

FUEL SYSTEM OF INTERNAL-COMBUSTION ENGINES

Daniel Petrus Maker, Northdene, Durban, Natal Province, Union of South Africa

Application June 2, 1953, Serial No. 359,093

6 Claims. (Cl. 123—119)

My invention relates to the fuel systems of internal combustion engines, and more particularly to fuel systems of motor vehicles operating on petrol.

The object of my invention is to provide a fuel system which will reduce the fuel consumption of the engine under normal running conditions, and accordingly I provide in an internal combustion engine for a motor vehicle, means whereby a regulated portion of cleansed exhaust gases is returned to the inlet manifold to mix with the incoming fuel supply.

I further provide for a portion of the exhaust gases to assist in the vaporization of the intake fuel supply.

A preferred embodiment of my invention is illustrated diagrammatically in the accompanying drawings as applied to a motor vehicle engine.

As shown in the drawings there is provided a float chamber 1 connected to a carburettor 2 such as the normal type of up draft carburettor illustrated. The float chamber 1 is supplied with liquid fuel by connection 3, and the air intake 4 to the carburettor is controlled by a butterfly valve 5 operated by an accelerator pedal 6 in the normal manner.

In the exhaust pipe 7 is fitted a valve 8 and said pipe 7 is connected, on the exhaust manifold side of the valve 8, to the inlet manifold 9 by a conduit 10. In the length of the conduit 10 is fitted a filter 11 which may be of any suitable type, such as an oil or water bath type, or a water bath type followed by an oil bath type. In the conduit 10, between the filter 11 and inlet manifold 9, is fitted an auxiliary valve 12. The valve 8 acts partially to restrict the flow of exhaust gases through the pipe 7, so that part of the exhaust gases together with any entrained unburnt fuel and excess oxygen and carbon monoxide, are diverted through the conduit 10 back to the inlet manifold 9. The amount of exhaust gas so diverted will depend on the degree of closing of the valve 8, and this is controlled manually or automatically or, as illustrated, by a combination of such methods.

Generally, the richer the mixture to the inlet manifold 9, the larger the amount of exhaust gases it is desirable to return to said inlet manifold 9. The mixture will normally be unnecessarily rich when the vehicle is travelling at high speed, or when it is travelling up a hill at slow engine speeds. In the former case there is a reduction in induction manifold pressure so that by the use of a pressure responsive device, such as the diaphragm 13 and casing 14 illustrated, the degree of opening of valve 8 may be made responsive to induction manifold pressure, the valve 8 closing to a greater degree with decrease in induction manifold pressure. As shown the one side 15 of the casing is closed and connected to the induction manifold and the side 16 is open to atmosphere. The diaphragm 13 is directly connected to the valve 8 so that movement of the diaphragm 13 will cause corresponding movement of said valve 8.

Since there will be no decrease in induction manifold pressure when the vehicle is travelling at slow speeds up a hill, the pressure responsive device will not operate as required, that is, to close the valve 8. For this reason there may be provided a manually operated override control 17 fitted in the dashboard 18 of the vehicle and connected to the valve 8. Alternatively the pressure responsive device may be dispensed with and only the manual control 17 used. A gauge 19 connected to the top of the filter 11 adjacent to the outlet 20 indicates the back pressure in the exhaust system and thus aids in the adjustment of the manual control 17.

It has been found that with the induction system according to this invention, it is difficult to obtain slow idling speeds. For this reason the auxiliary valve 12 is used to cut off the recirculated supply of exhaust gases to the induction manifold 9. This may be accomplished manually by the control 21 on the dashboard 18, or automatically by the accelerator pedal 6. In the latter case depression of the pedal 6 beyond a certain point acts through levers 22, 23, 24, and spring 25 to open the valve 12, while the lifting of the throttle pedal 6 causes the valve 12 to close.

The cleansed exhaust gases from the filter 11 may, according to my invention, also be used to heat up and thus assist in the vaporization of the liquid fuel supply to the carburettor 2. For this purpose a tube 26 is connected from the outlet end of the filter 11 to discharge a small part of the exhaust gases into the float chamber 1 and thus heat up the fuel therein. This feature is of value in cold weather or when less volatile fuels, such as kerosene, are used. A tubular connection 27, between the top of the float chamber 1 and manifold 9, returns the exhaust gases and any liquid fuel which may be entrained therein to the induction system. A check valve 28 in the tube 26 acts to prevent a reversal of flow should excessive pressure build up in the float chamber 1.

In use the engine is started up in the normal manner and with valve 12 closed and valve 8 open. When the speed of the engine is increased, valve 12 is fully opened and valve 8 closed to an extent approximately proportional to the engine speed, except when the vehicle is running up hills when the valve 8 is kept open only to a small degree even when the engine speed is low, unless override control 17 is used.

It is appreciated that my device increases the back pressure in the exhaust system, and also appears to cause the introduction into the induction manifold of a gas containing a larger proportion of inerts than those contained in atmospheric air. While both these factors would apparently reduce the overall efficiency of the engine, nevertheless, my tests have shown that this is not the case, and with the fuel system according to this invention, I have obtained a very appreciable increase in economy and an apparent increase in power without adverse effect on the engine.

What I claim as new and desire to secure by Letters Patent is:

1. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, a pressure responsive means connected to the inlet manifold and to said control valve whereby the degree of opening of said valve is controlled by the pressure of the inlet manifold, and a filter in the length of the conduit for cleaning the exhaust gases passing therethrough.

2. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, a pressure responsive means connected to the inlet manifold and to said control valve whereby the degree of opening of said valve is controlled by the pressure of the inlet manifold, and a filter in the length of the conduit for cleaning the exhaust gases passing therethrough, said filter comprising a water and an oil bath and conduits for passing the exhaust gases through said baths.

3. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, and a filter in the length of the conduit for cleaning the exhaust gases passing therethrough, and an auxiliary manually operated valve in the conduit between the filter and inlet manifold.

4. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, and a filter in the length of the conduit for cleaning the exhaust gases passing therethrough, an auxiliary manually operated valve in the conduit between the filter and the inlet manifold, an accelerator pedal operatively connected to the carburettor and auxiliary valve.

5. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, a filter in the length of the conduit for cleaning the exhaust gases passing therethrough, and a tube connecting the conduit between the filter and inlet manifold to the float chamber.

6. A fuel system for an internal combustion engine comprising an inlet manifold, a carburettor and float chamber for supplying a vaporized mixture of fuel and air to the inlet manifold, an exhaust manifold, a conduit connecting the exhaust and inlet manifold, a control valve for regulating the passage of the exhaust gases from the exhaust to the inlet manifold, a filter in the length of the conduit for cleaning the exhaust gases passing therethrough, a tube connecting the conduit between the filter and inlet manifold to the float chamber and a further tube connecting the top of the float chamber to the inlet manifold.

References Cited in the file of this patent

UNITED STATES PATENTS

| | | |
|---|---|---|
| 2,025,362 | Starr | Dec. 24, 1935 |
| 2,134,786 | Haring | Nov. 1, 1938 |
| 2,627,851 | Cushman | Feb. 10, 1953 |